United States Patent [19]

Skrivseth

[11] 4,196,719
[45] Apr. 8, 1980

[54] HEAT STORAGE MEANS FOR SOLAR HEATING SYSTEM

[75] Inventor: Robert K. Skrivseth, Whitewater, Wis.

[73] Assignee: SolaRay, Inc., Whitewater, Wis.

[21] Appl. No.: 861,697

[22] Filed: Dec. 19, 1977

[51] Int. Cl.² .............................................. F24J 3/02
[52] U.S. Cl. ................................... 126/430; 126/436; 126/400; 165/18; 165/104 S
[58] Field of Search ............... 237/1 A; 126/400, 270, 126/271, 436, 430; 165/104 S, 18

[56] References Cited

U.S. PATENT DOCUMENTS

| | | | |
|---|---|---|---|
| 965,391 | 7/1910 | Little | 126/270 |
| 3,946,721 | 3/1976 | Keyes et al. | 126/270 |
| 4,029,258 | 6/1977 | Groth | 237/1 A |
| 4,051,891 | 10/1977 | Harrison | 126/270 X |
| 4,051,999 | 10/1977 | Granger et al. | 126/270 X |
| 4,076,013 | 2/1978 | Bette | 126/400 X |

OTHER PUBLICATIONS

*Sun Stone Solar Energy Equipment Catalogue*, Chicago, Ill., p. 1, Mar. 9, 1979.

*Primary Examiner*—Albert J. Makay
*Assistant Examiner*—Henry Bennett
*Attorney, Agent, or Firm*—Merriam, Marshall & Bicknell

[57] ABSTRACT

An improved pebble bed heat storage means is provided for a solar heating system using air as the heat transfer medium. The pebble bed is confined in a crib or bin contained in an outer housing. The sides of the bin are air pervious and are spaced from the side walls of the housing to define enlarged plenum chambers. Baffles or partitions divide each of the plenum chambers into upper and lower plenum spaces. An upper warm air inlet is provided for the upper plenum space at one side of the pebble bed and is connected by a duct to the outlet from the solar collector panels. An upper warm air outlet is provided at the upper plenum space at the opposite side of the pebble bed and is connected through a conventional furnace with the room space to be heated. A lower cool air inlet is provided for the lower plenum space at the same side of the pebble bed as the upper warm air inlet and is connected to the room space by a cool air return duct. A lower cool air outlet is provided at the lower plenum space at the same side of the pebble bed as the upper warm air outlet and is connected by a blower and a duct to the inlet of the solar collector panels.

9 Claims, 8 Drawing Figures

HEAT STORAGE MEANS FOR SOLAR HEATING SYSTEM

This invention relates to a novel and improved solar heating system. More particularly, the invention relates to a novel and improved means for heat storage and air circulation in a solar heating system using air as the heat transfer medium.

A conventional solar heating system of the type using air as the heat transfer medium has roof mounted collector panels and a heat storage means, usually a large bin of pebbles or rocks at ground level or in the basement of the building. An arrangement of ducts and blowers or fans provides for flow of heated air from the collectors either to the storage bin or directly to the interior space of the building being heated, and cooled air is then recirculated to the collectors. The usual hot air furnace is connected into the system to supplement the solar heat source.

The principal objects of the present invention are to improve the efficiency and reliability of operation of such heat storage means and to provide enhanced operating flexibility of the same in order to meet the varying requirements imposed on the heating system. As will be seen hereinafter, these objects are achieved in the present invention by a unique structural arrangement in the heat storage means, particularly with regard to the air inlets and outlets.

Figure 1:
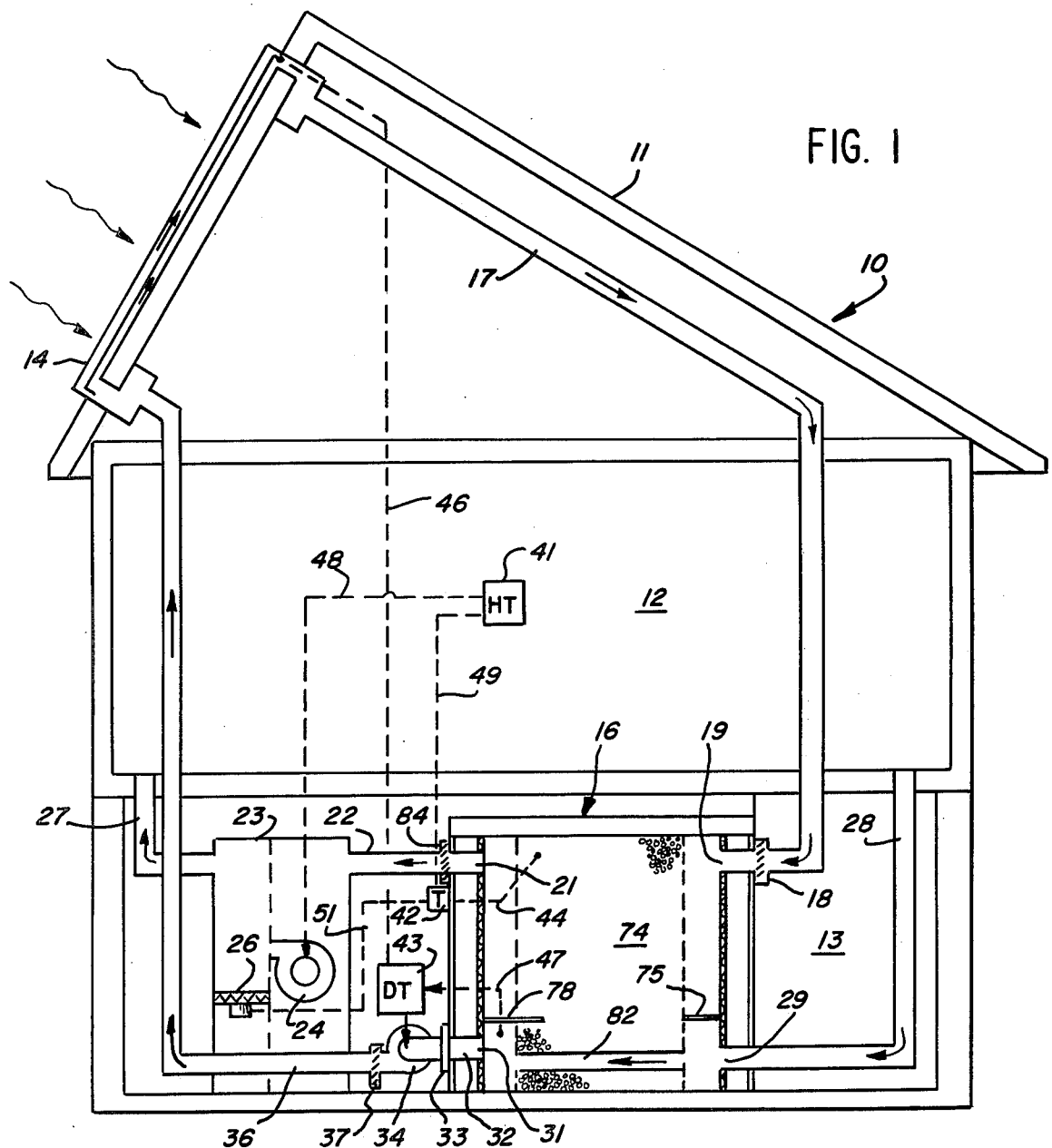
FIG. 1 is a schematic view of a forced air solar heating system utilizing the improved heat storage means of the present invention.
Figure 2:
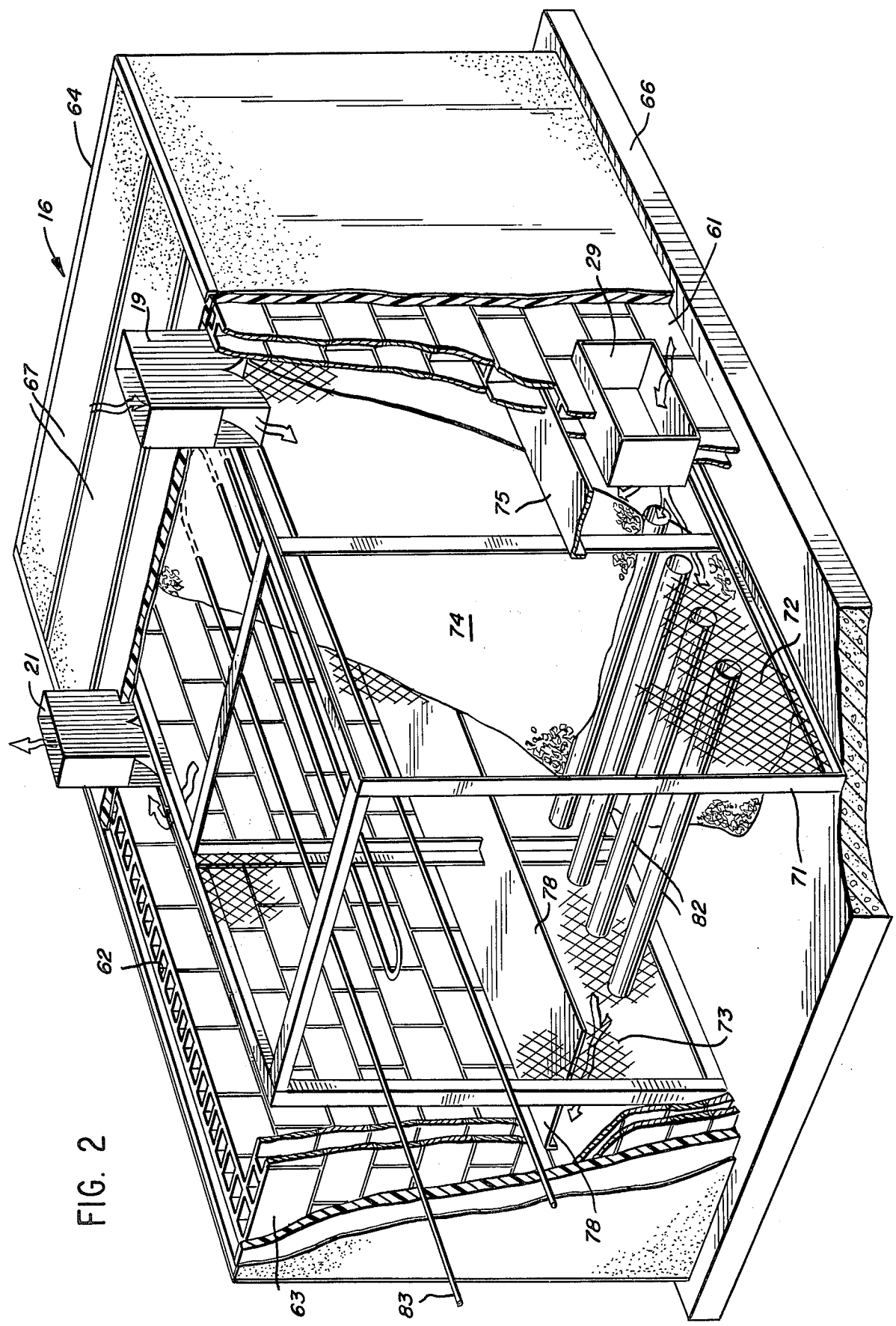
FIG. 2 is an enlarged perspective view of one specific and preferred embodiment of the heat storage means, external portions of the structure being broken away to reveal the interior construction.
Figure 3:
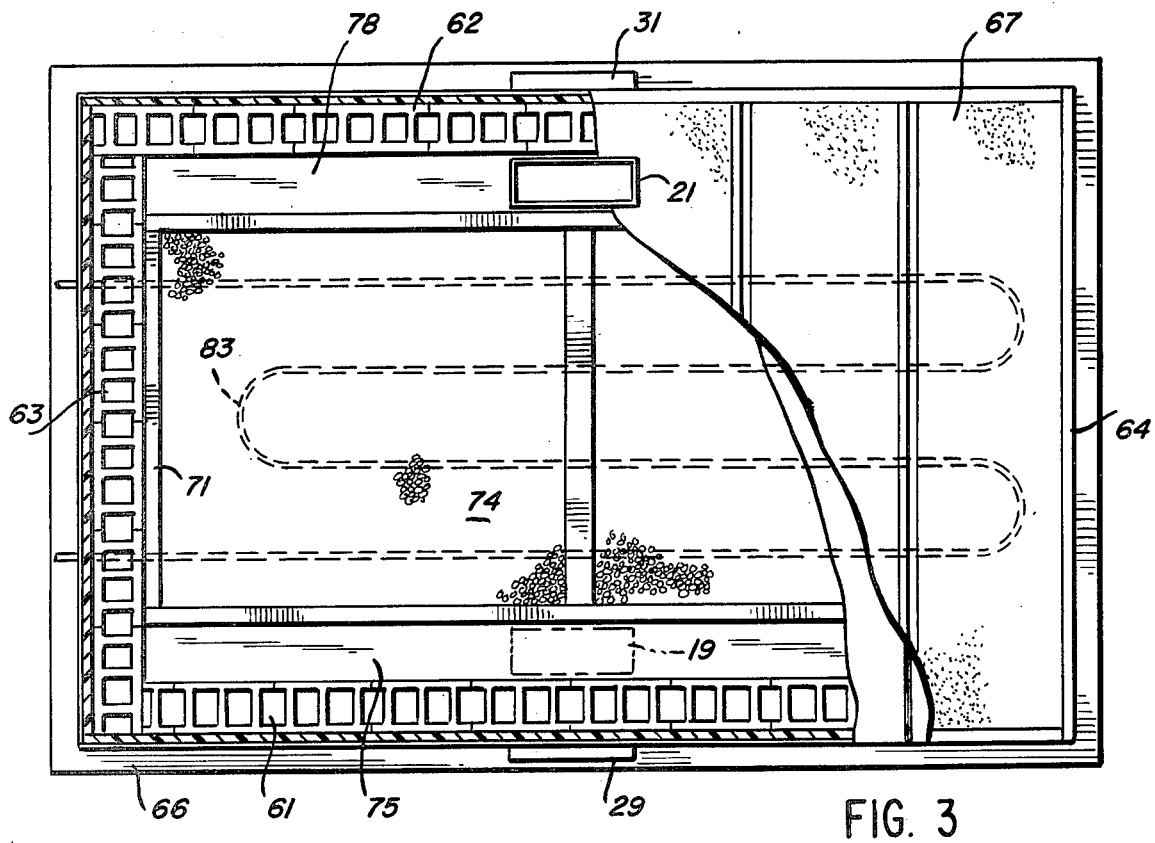
FIG. 3 is a top plan view, on a reduced scale, of the heat storage means shown in FIG. 2 with portions of the structure broken away.
Figure 4:
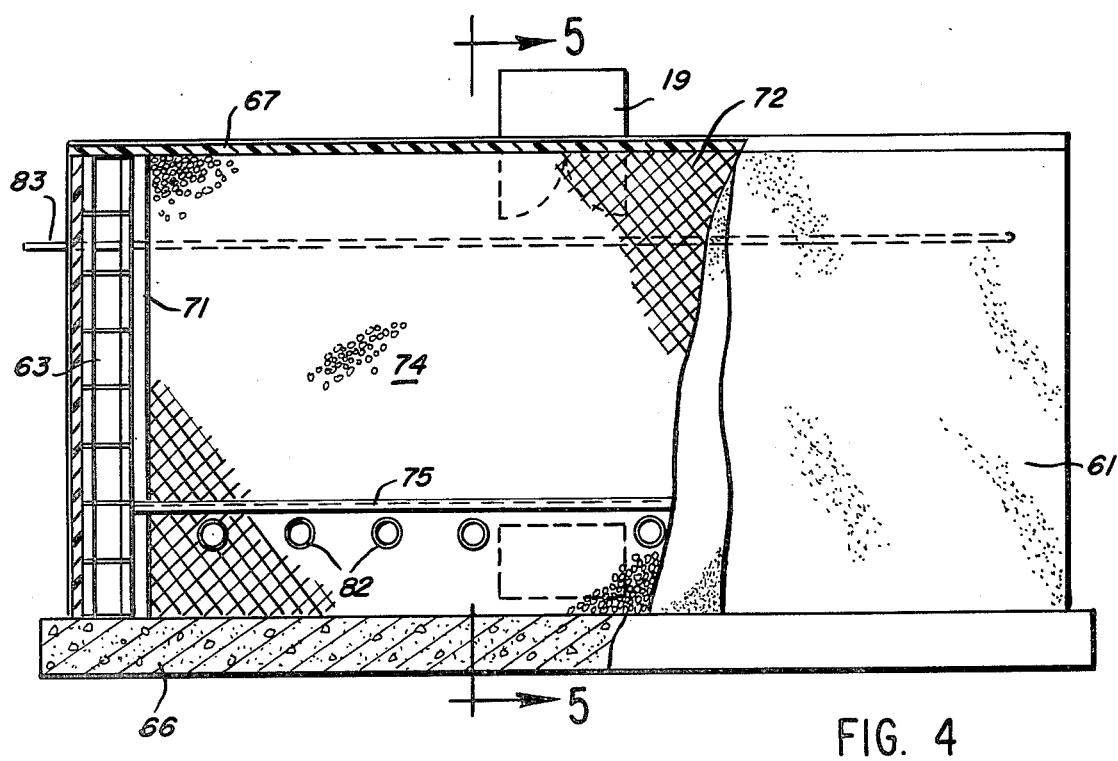
FIG. 4 is a side elevational view, on a reduced scale, of the heat storage means shown in FIG. 2 with portions of the structure broken away.

Referring first to FIG. 1, a building structure 10 is shown having a roof portion 11, interior room space 12, and a basement 13. An inclined portion of the roof 11 is provided with flat plate collector panels 14. Any type of collector panel suitable for solar heating of air may be used, but a preferred construction is disclosed in my co-pending application Ser. No. 773,801, filed Mar. 3, 1977, now U.S. Pat. No. 4,099,513, issued July 11, 1978.

In the basement area 13 the heat storage means of the present invention is provided in the form of a pebble storage bin 16 which is described in more detail below. A duct 17 supplies heated air from the collectors 14 through a gravity back draft damper 18 to an air inlet 19 at the upper portion of the pebble bed 16 at one side thereof. An air outlet 21 from the upper portion of the pebble bed 16 is provided at the opposite side thereof. A duct 22 supplies heated air through a gravity back draft damper 84 to an auxiliary air heater such as a conventional forced air furnace 23 having a blower 24 and a burner 26. The heated air then passes through a duct 27 to the room space 12 to be heated. When the warm air from duct 27 is forced into the room 12 by the blower 24, cooled air flows from the room 12 through a return duct 28 to another air inlet 29 in the lower portion of the pebble bed 16 at the same side of the bed as the inlet 19. Another air outlet 31 is provided at the opposite lower portion of the pebble bed 16 and is connected by a duct 32 containing an air filter 33 to a recirculating blower 34. Air is recirculated by the blower 34 through a duct 36 having a gravity back draft damper 37 to the solar collectors 14.

A control system is provided consisting of a conventional house thermostat 41 located in the room space 12, a thermostat 42 which senses and is responsive to the temperature in the upper portion of the pebble bed 16 adjacent the outlet 21, and a differential thermostat 43 which senses and is responsive to the temperature adjacent the outlet from the collectors 14 and in the lower portion of the pebble bed 16 adjacent the outlet 31. The dashed line 44 illustrates the connection between the thermostat 42 and its sensor or probe in the pebble bed 16, and the dashed lines 46 and 47 illustrate the connections between the differential thermostat 43 and its sensors or probes at the collectors 14 and the pebble bed 16, respectively. As also seen in the schematic drawing of FIG. 1, the house thermostat 41 has an output connection indicated by dashed line 48 for effecting operation of the furnace blower 24 when the temperature in the room 12 falls below a predetermined minimum. Thus, air is withdrawn from the pebble bed 16 through the outlet 21 and the duct 22, is forced by the blower 24 from the furnace 23 through the duct 27 into the room 12, and is returned to the pebble bed 16 through the duct 28 and the inlet 29. The thermostat 41 has another output connection 49 in series with the thermostat 42 which in turn has an output connection 51 for energizing the burner 26. Thus, when the temperature in the pebble bed 16 falls below a predetermined minimum, which is sensed at 44, and the house thermostat 41 senses that the room temperature is below its predetermined minimum setting, the burner 26 is then activated and the furnace 23 operates in the usual manner.

The differential thermostat 43 is arranged so that when a predetermined temperature differential, say 20° F., between the pebble bed outlet 31 and the outlet of the collectors 14 is exceeded, the blower 34 is activated. In other words, when the temperature at the outlet of the collectors 14 is at least 20° F. higher than the temperature at the pebble bed outlet 31, air is withdrawn by the blower 34 from the pebble bed 16, passed through the duct 36 to the collectors 14, and is then returned by the duct 17 to the pebble bed 16. In order to prevent loss of heat from the pebble bed 16, the gravity back draft dampers 18 and 37 close automatically when the blower 34 is not operating but open automatically in response to air flow when the blower 34 is in operation. Likewise, the gravity back draft damper 84 closes automatically when the furnace blower 24 is not operating but opens automatically when blower 24 is in operation.

Referring to FIGS. 2-5, the heat storage means 16 is contained in a housing structure comprising a rectangular enclosure having elongated side walls 61 and 62 and transverse end walls 63 and 64 supported on a base 66. The housing walls may be constructed of any convenient material such as ceramic or concrete block or wood frame, and one or more outer layers of insulating and finishing material are preferably provided, as shown in the drawings, so that the housing is substantially air impervious. For example, a suitable wall construction consists of eight inch concrete blocks with two inch foamed plastic insulating panels and one-half inch gypsum board finishing panels. Removable cover panels 67 are provided at the top of the rectangular enclosure to complete the housing structure. As an example, the cover panels may conveniently be a composite of one-half inch gypsum board and glass fiber or rock wool insulation encased in a peripheral wood frame.

Figure 5:
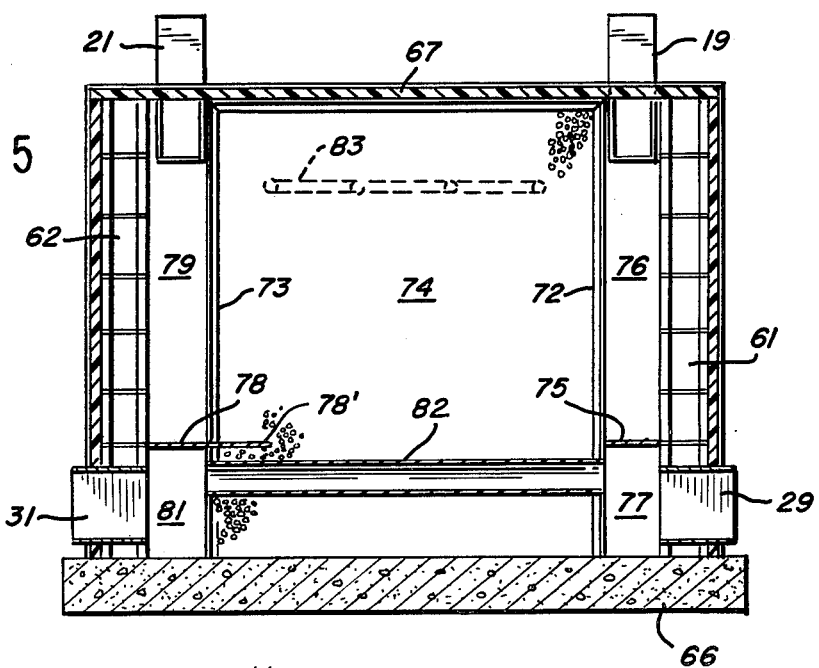
FIG. 5 is a cross-sectional view as seen along the line 5—5 of FIG. 4.

Within the housing structure, a container in the form of a steel framed storage bin or crib is provided which comprises a rectangular steel framework 71 supported on the base 66 and extending lengthwise between and abutting against the housing end walls 63-64. The elongated sides of the framework 71 are covered with air pervious panels of expanded metal or mesh, as indicated at 72 and 73, and the mesh walls are spaced inwardly from the housing side walls 61-62 to provide air plenum chambers at each side of the housing. The top of the framework 71 is open so that when the cover panels 67 are removed the confined space between the mesh walls 72-73 and the housing end walls 63-64 can be filled with a mass of subdivided solid heat retention material 74, e.g. washed rocks, gravel, or pebbles. The plenum chamber between the housing wall 61 and the adjacent mesh wall 72 is divided by solid partition or baffle 75 to form an upper plenum space 76 and a lower plenum space 77 (FIG. 5). Similarly, the plenum chamber between the housing wall 62 and the adjacent mesh wall 73 is divided by a solid partition or baffle 78 to form an upper plenum space 79 and a lower plenum space 81 (FIG. 5). The upper and lower air inlets indicated schematically in FIG. 1 at 19 and 29 are designated by the same numerals in FIGS. 2-5 which show that the inlets 19 and 29 are mounted in the housing structure so as to communicate with the segregated plenum spaces 76 and 77, respectively. The upper and lower air outlets 21 and 31 are similarly mounted to communicate with the segregated plenum spaces 79 and 81, respectively. The partition or baffle 78 also extends inwardly into the pebble bed 74 beyond the mesh wall 73, as designated at 78', in order to minimize short circuit flow between the plenum spaces 79 and 81, as hereinafter described. In certain cases, if desired, a plurality of open tubes or pipes 82 may be provided through the lower portion of the pebble bed 74 between the sides 72 and 73 of the storage crib in order to reduce the resistance to air flow from the plenum space 77 to the plenum space 81, as also described hereinafter.

A heat transfer pipe 83 (FIGS. 2-5) is imbedded in the upper portion of the pebble bed 74 and may be connected to the customary hot water supply system to supplement the same.

Figure 6:
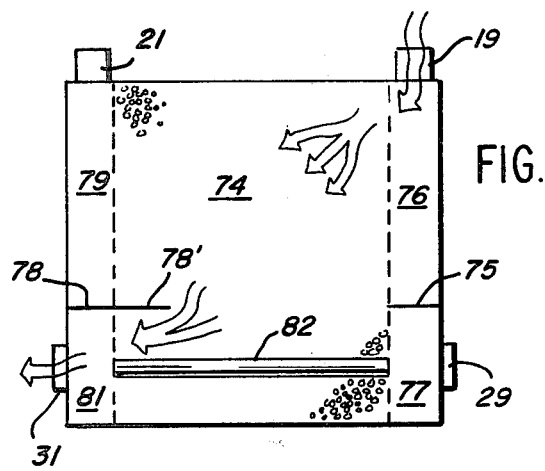
FIGS. 6-8 are schematic views illustrating different operating modes of the system.
Figure 7:
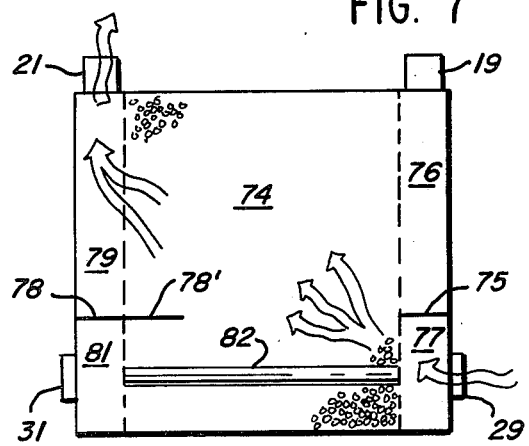
Figure 8:
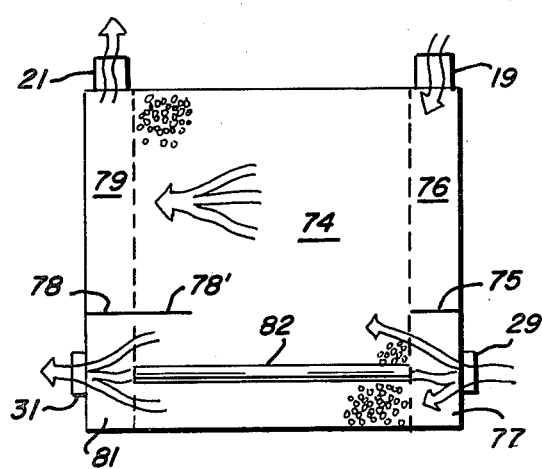

Referring now to FIGS. 6-8 the several operating modes of the heat storage means 16 will be described in conjunction with FIG. 1.

FIG. 6 shows the operating mode wherein thermal energy is being added to the heat storage means 16, as might be the case, for example, during a bright sunny day when the heating demand by the room space 12 is at a minimum. When the temperature in the room space 12 is above the minimum setting of the house thermostat 41, the blower 24 and the burner 26 will not be operating and the damper 84 will remain closed. However, the high temperature at the collectors 14 causes the differential thermostat 43 to place the blower 34 in operation, and heated air is drawn from the collectors 14 through the duct 17 into the inlet 19 and the plenum space 76.

The heated air is then drawn transversely and downwardly through the pebble bed 74 into the plenum space 81, as shown by the arrows in FIG. 6, thereby giving up heat to the pebble bed 74 which is at a lower temperature. The cooled air is drawn from the plenum space 81 through the outlet 31 and the duct 32 and is recycled through the duct 36 to the collectors 14.

FIG. 7 shows the operating mode wherein thermal energy is being dispensed from the heat storage means 16, as might be the case, for example, at night when the heating requirements of the room space 12 are greater. Since the temperature at the collectors 14 will be much lower than in the daytime, the differential thermostat 43 will allow the blower 34 to remain in non-operating condition with the dampers 18 and 37 closed. However, when the temperature in the room 12 falls below the minimum setting of the house thermostat 41, the blower 24 becomes operative and cool air is drawn from the room 12 through the duct 28 and the inlet 29 into the plenum space 77. The cool air flows upwardly and transversely through the pebble bed 74 into the plenum space 79, as shown by the arrows in FIG. 7, and heat is given up by the pebble bed to the air which is at a lower temperature. The heated air is drawn from the outlet 21 and passes through the furnace 23 and duct 27 into the room space 12. If the heat stored in the pebble bed 74 is not sufficient to meet the demand called for by the setting of the house thermostat 41, the burner 26 will be turned on automatically to supply additional heat as air passes through the furnace 23.

FIG. 8 shows the operation wherein both modes of FIGS. 6 and 7 are operative simultaneously. This might be the situation, for example, during a sunny day when the room temperature is such that the house thermostat 41 causes the furnace blower 24 to operate and when the temperature at the collectors 14 is high enough to cause the blower 34 to operate. In such case, heated air is drawn by the blower 24 from the plenum space 79 and the outlet 21 and is circulated through the duct 27 to the room space 12, and cooled air is returned to the plenum space 77 through the inlet 29. In this operating mode, however, the cooled air may pass in the path of least resistance from the plenum space 77 through the optional by-pass pipes 82 to the plenum space 81 and is then drawn by the blower 34 from the outlet 31. The cool air is then circulated through the duct 36 to the solar collectors 14 where it is heated and returned by the duct 17 to the inlet 19 and the plenum space 76 of the heat storage means. During this mode of operation, when air is flowing from both outlets 21 and 31, the baffle extension 78' functions to reduce or minimize any tendency for short circuit flow of warm air from the plenum space 79 to the plenum space 81.

From the foregoing description, it will be seen that the invention provides a highly efficient, reliable, and low cost pebble bed heat storage arrangement in which the cool air inlet and outlet and the warm air inlet and outlet are located at oppositely disposed vertical surface areas of the pebble bed in such manner that air must always flow unidirectionally through the pebble bed so as to obtain maximum heat transfer efficiency between the air and the storage means. Moreover, the arrangement permits complete flexibility in mode of operation with a simple and inexpensive control system and without the necessity of providing for reversal of air flow through the pebble bed for different operating modes and without the need for a plurality of expensive power operated dampers and associated controls.

Although the invention has been described with particular reference to the illustrated embodiment, it is to be understood that various modifications may be made without departing from the scope of the invention as defined in the appended claims.

I claim:

1. In a solar heating system for a space to be heated, said system having a solar collector for heating air and heat storage means adapted to have air passed therethrough, the improvement wherein said heat storage means comprises a container having air pervious sides, and a mass of solid heat retention material confined within said container, said air pervious sides of said container defining vertically extending surface areas at opposite sides of said mass, means defining a pair of segregated upper and lower plenum spaces at each of said opposite surface areas of said mass, a first air inlet communicating with the upper plenum space at one of said surface areas, a first air outlet communicating with the upper plenum space at the other of said surface areas, a second air inlet communicating with the lower plenum space at said one surface area, a second air outlet communicating with the lower plenum space at said other surface area, first air circulating means connecting said collector to said first air inlet and to said second air outlet for circulating warm air from said collector to said mass and back to said collector, and second air circulating means connecting said space to said second air inlet and to said first air outlet for circulating cool air from said space to said mass and back to said space.

2. The system of claim 1, further characterized in that said heat storage means comprises an outer housing having a pair of oppositely disposed end walls and a pair of oppositely disposed side walls, an inner crib with air pervious sides defining said surface areas and spaced inwardly from said side walls of said housing to define a pair of plenum chambers therebetween, a mass of subdivided solid heat retention material confined in the space between said end walls of said housing and said sides of said crib, and partition means extending across and dividing each of said plenum chambers into an upper plenum space and a lower plenum space, said first and second air inlets communicating with the upper and lower plenum spaces, respectively, of one of said plenum chambers at said one surface area, and said first and second air outlets communicating with the upper and lower plenum spaces, respectively, of the other of said plenum chambers at said other surface area.

3. The system of claim 2 further characterized in that said first air circulating means includes a blower between said second air outlet and said collector, and gravity back draft damper means for preventing passage of air through said first air inlet and through said second air outlet except when said blower is operating.

4. The system of claim 3 further characterized in that operation of said blower is controlled by a differential thermostat responsive to a predetermined temperature difference between said collector and the air from said second air outlet.

5. The system of claim 2 further characterized in that said second air circulating means includes an auxiliary air heater interposed in flow communication between said first air outlet and said space.

6. The system of claim 5 further characterized in that said auxiliary air heater comprises a forced air furnace having a furnace blower and a burner, and gravity back draft damper means for preventing passage of air from said first air outlet except when said furnace blower is operating, and control means is provided comprising a first thermostat responsive to the temperature in said space, and a second thermostat connected in series with said first thermostat and responsive to the temperature in the upper portion of said mass, operation of said furnace blower being controlled by said first thermostat, and operation of said burner being controlled by said first and second thermostats.

7. The system of claim 2 further characterized by the provision of a removable top cover on said housing for filling said crib with said heat retention material.

8. The system of claim 2 further characterized in that the partition means for said other plenum chamber extends inwardly into said mass to provide a baffle for reducing any tendency for short circuit flow of warm air from said upper plenum space to said lower plenum space of said other plenum chamber.

9. The system of claim 2 further characterized by the provision of a plurality of open tubes extending through the lower portion of said mass between said sides of said crib to provide reduced resistance to air flow between the plenum spaces for said second air inlet and said second air outlet.

* * * * *